United States Patent
Matsumura et al.

(10) Patent No.: US 8,887,183 B2
(45) Date of Patent: Nov. 11, 2014

(54) OPTICAL DISC DEVICE AND LENS CLEANER

(75) Inventors: Asayuki Matsumura, Osaka (JP); Tomio Yamamoto, Hyogo (JP); Akihiko Nishioka, Osaka (JP); Masahiro Inagaki, Osaka (JP)

(73) Assignee: Panasonic Corporation, Osaka (JP)

( * ) Notice: Subject to any disclaimer, the term of this patent is extended or adjusted under 35 U.S.C. 154(b) by 15 days.

(21) Appl. No.: 13/817,936

(22) PCT Filed: Nov. 18, 2011

(86) PCT No.: PCT/JP2011/006442
§ 371 (c)(1),
(2), (4) Date: Feb. 20, 2013

(87) PCT Pub. No.: WO2013/072971
PCT Pub. Date: May 23, 2013

(65) Prior Publication Data
US 2014/0189717 A1    Jul. 3, 2014

(51) Int. Cl.
*G11B 17/04* (2006.01)
*G11B 23/03* (2006.01)
*G11B 7/121* (2012.01)

(52) U.S. Cl.
CPC ............ *G11B 7/121* (2013.01); *G11B 23/0327* (2013.01)
USPC .......................................... 720/626; 720/624

(58) Field of Classification Search
USPC .................. 720/626, 645, 619, 620, 636, 624
See application file for complete search history.

(56) References Cited

U.S. PATENT DOCUMENTS

| 4,375,658 A | 3/1983 | Martinelli |
| 5,150,349 A * | 9/1992 | Takai et al. ................... 720/626 |
| 5,966,360 A * | 10/1999 | Miyazaki et al. ............... 369/71 |

(Continued)

FOREIGN PATENT DOCUMENTS

| JP | 63-6923 | 2/1988 |
| JP | 10-255386 | 9/1998 |

(Continued)

OTHER PUBLICATIONS

International Search Report issued Apr. 17, 2012 in International (PCT) Application No. PCT/JP2011/006442.

(Continued)

*Primary Examiner* — Brian Miller
(74) *Attorney, Agent, or Firm* — Wenderoth, Lind & Ponack, L.L.P.

(57) ABSTRACT

An optical disc device of the present invention comprises an insertion detection optical sensor which detects insertion of an optical disc based on light emitted from a first light emitting element to a first light receiving element being blocked, and an ejection detection optical sensor provided on the downstream side in the carry-in direction to the insertion detection optical sensor to detect ejection of the optical disc based on light emitted from a second light emitting element to a second light receiving element being blocked. The optical disc device is structured such that, in a state that the optical disc is attached onto the turntable, when the light of the first light emitting element is blocked and the light of the second light emitting element is not blocked, the optical disc device recognizes that a lens cleaner is attached onto the turntable as the optical disc, and the optical disc device performs a cleaning operation.

6 Claims, 14 Drawing Sheets

(56) References Cited

U.S. PATENT DOCUMENTS

| | | | |
|---|---|---|---|
| 6,288,982 B1* | 9/2001 | Kato | 369/30.36 |
| 6,480,442 B1* | 11/2002 | Nakatani et al. | 369/30.36 |
| 7,180,840 B1* | 2/2007 | Kim | 369/53.2 |
| 7,356,825 B2* | 4/2008 | Makisaka et al. | 720/626 |
| 7,444,652 B2* | 10/2008 | Fritsch et al. | 720/671 |
| 8,064,311 B2* | 11/2011 | Holbrook et al. | 369/71 |
| 8,234,665 B2* | 7/2012 | Kato | 720/626 |
| 2002/0018427 A1* | 2/2002 | Hino et al. | 369/77.1 |
| 2005/0251815 A1* | 11/2005 | Lin | 720/626 |
| 2007/0214466 A1* | 9/2007 | Obikane et al. | 720/718 |
| 2007/0288946 A1* | 12/2007 | Chang et al. | 720/626 |

FOREIGN PATENT DOCUMENTS

| | | |
|---|---|---|
| JP | 2000-331447 | 11/2000 |
| JP | 2001-216669 | 8/2001 |
| JP | 2003-248995 | 9/2003 |
| JP | 2003-288731 | 10/2003 |

OTHER PUBLICATIONS

International Preliminary Report on Patentability issued May 20, 2014 in International (PCT) Application No. PCT/JP2011/006442.

* cited by examiner

OPTICAL DISC DEVICE AND LENS CLEANER

TECHNICAL FIELD

The present invention relates to an optical disc device that performs recording or reproduction of information on or from an optical disc such as a CD (compact disc), a DVD (digital versatile disc), or the like. In particular, the present invention relates to a lens cleaner that cleans a lens of an optical head included in such an optical disc device.

BACKGROUND ART

Conventionally, an optical disc device of this kind has an optical head that emits light in order to record or reproduce information on or from an optical disc. The optical head emits light from an objective lens, to record information on the optical disc. Further, the optical head emits light from the objective lens and detects the reflected light reflected from the optical disc, to reproduce information recorded on the optical disc.

In the case where dirt or dust is attached to the objective lens of the optical head, the light cannot appropriately be emitted, and hence it becomes difficult to perform recording or reproduction of information to the optical disc. Accordingly, the technique relating to a lens cleaner cleaning the objective lens is disclosed in, for example, Patent Document 1 (Japanese Unexamined Patent Publication No. 2000-331447) and Patent Document 2 (Japanese Unexamined Patent Publication No. 2003-288731).

Patent Document 1 discloses the technique in which a cleaning member such as a brush is provided on the surface of a disc-like lens cleaner. By allowing the lens cleaner to rotate on the turntable, the objective lens is cleaned.

Patent Document 2 discloses the technique in which a cutout portion is provided to a lens cleaner. When the lens cleaner is carried in, the clamping operation of attaching an optical disc onto the turntable is not performed. Using the retry operation which is automatically performed when an optical disc is not appropriately carried in, the lens cleaner is carried-in in a reciprocating manner, so that the objective lens is cleaned by a cleaning member provided to the lens cleaner. It is noted that, the retry operation refers to the operation, which is performed when the carry-in operation completion cannot be detected after a lapse of the time required for completing the carry-in operation of the optical disc (e.g., 2 sec), in which the optical disc is once ejected from inside the device to the disc insert slit, and thereafter the optical disc is again carried into the device.

PRIOR ART DOCUMENTS

Patent Documents

Patent Document 1: Japanese Unexamined Patent Publication No. 2000-331447

Patent Document 2: Japanese Unexamined Patent Publication No. 2003-288731

With the technique disclosed in Patent Document 1, light is emitted from the objective lens and the reflected light reflected from the lens cleaner is detected. Based on that, attachment of the lens cleaner onto the turntable is checked, and the lens cleaner is rotated. Provided that the objective lens is more or less grimed, so long as the reflected light can be detected by the amount enough to carry out the check, the lens cleaner can be rotated to clean the objective lens.

However, when the objective lens is greatly grimed and the reflected light cannot be detected, the check cannot be carried out. Unless the checking is carried out, the lens cleaner does not rotate. Accordingly, with the technique disclosed in Patent Document 1, when the objective lens is greatly grimed, the objective lens cannot be cleaned.

Further, with the technique disclosed in Patent Document 2, without recognition of the lens cleaner being attached onto the turntable, the objective lens is cleaned by allowing the lens cleaner to advance and recede in the disc insert direction using the retry operation. With general optical disc devices, the retry operation is normally performed for once to a few times. That is, with the technique disclosed in Patent Document 2, the cleaning member of the lens cleaner and the objective lens are brought into contact with each other for a few times. That is, in some cases, the grime on the objective lens may not fully be cleaned. In particular, when the objective lens is greatly grimed, the grime on the objective lens cannot fully be cleaned.

Accordingly, an object of the present invention is to solve the problem described above, and to provide an optical disc device and a lens cleaner that can more surely clean the grime off from the objective lens even when the objective lens is greatly grimed.

SUMMARY OF THE INVENTION

In order to achieve the object stated above, the present invention has the following structures.

According to a first aspect of the present invention, there is provided an optical disc device, comprising:

a spindle motor that rotates a turntable to which an optical disc is attached;

an optical head which emits light from an objective lens to the optical disc to perform recording or reproduction of information;

an insertion detection optical sensor which detects that the optical disc is inserted into a disc insert slit based on light emitted from a first light emitting element to a first light receiving element being blocked; and an ejection detection optical sensor provided on a downstream side in a disc carry-in direction to the insertion detection optical sensor, the ejection detection optical sensor detecting that the optical disc is ejected to the disc insert slit based on light emitted from a second light emitting element to a second light receiving element being blocked, wherein in a state that the optical disc is attached onto the turntable, when the light emitted from the first light emitting element to the first light receiving element is blocked and the light emitted from the second light emitting element to the second light receiving element is not blocked, the optical disc device recognizes that a lens cleaner is attached onto the turntable as the optical disc, and the optical disc device performs a cleaning operation.

According to a second aspect of the present invention, there is provided the optical disc device according to the first aspect, wherein the cleaning operation is an operation in which the turntable is rotated to thereby bring a cleaning member provided at the lens cleaner into contact with the objective lens to clean the objective lens.

According to a third aspect of the present invention, there is provided the optical disc device according to the first aspect, wherein the cleaning operation is an operation in which the optical head is carried in a reciprocating manner in a radial direction, to thereby bring the objective lens into contact with a cleaning member provided at the lens cleaner to clean the objective lens.

According to a fourth aspect of the present invention, there is provided the optical disc device according to one of the first to third aspects, further comprising an attachment detecting sensor which detects that the optical disc is attached onto the turntable, wherein in a state that the attachment detecting sensor detects that the optical disc is attached onto the turntable, when the light emitted from the first light emitting element to the first light receiving element is blocked and the light emitted from the second light emitting element to the second light receiving element is not blocked, the optical disc device recognizes that the lens cleaner is attached onto the turntable as the optical disc, and the optical disc device performs the cleaning operation.

According to a fifth aspect of the present invention, there is provided a lens cleaner used for the optical disc device according to one of the first to fourth aspects, wherein the lens cleaner comprises a light blocking potion which blocks the light emitted from the first light emitting element to the first light receiving element and a light transmitting portion which transmits the light emitted from the second light emitting element to the second light receiving element, when the lens cleaner is attached onto the turntable.

According to a sixth aspect of the present invention, there is provided the lens cleaner according to the fifth aspect, wherein the lens cleaner is formed to be disc-like, and the light transmitting portion is formed to be annular.

With the optical disc device of the present invention, attachment of the lens cleaner onto the turntable is recognized based on the detection information of the insertion detection optical sensor and the ejection detection optical sensor. That is, with the optical disc device of the present invention, attachment of the lens cleaner onto the turntable is recognized through the method which is different from that disclosed in Patent Document 1. Accordingly, even when the objective lens is greatly grimed, the cleaning operation such as rotation of the turntable can be performed.

Further, with the optical disc device of the present invention, since the cleaning operation is performed after the attachment of the lens cleaner onto the turntable is recognized, an optimum cleaning operation for cleaning the grime off from the objective lens can be performed. Accordingly, the grime on the objective lens can more surely be cleaned off.

BRIEF DESCRIPTION OF THE DRAWINGS

These and other objects and features of the present invention will become apparent from the following description of embodiments taken in conjunction with the accompanying drawings, in which.

DETAILED DESCRIPTION OF THE INVENTION

Figure 1:
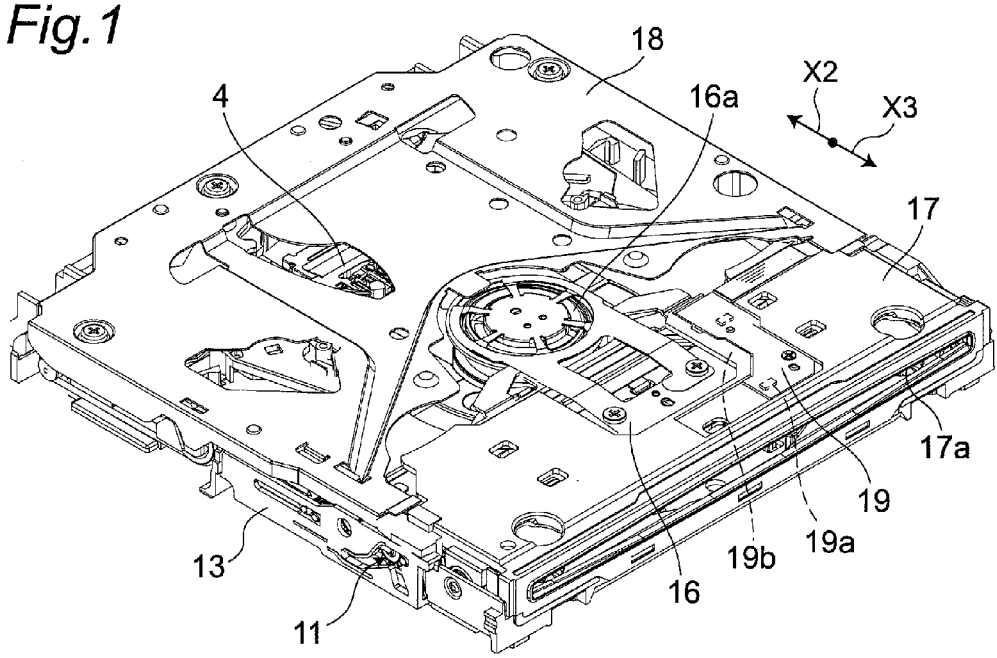
FIG. 1 is a perspective view of an optical disc device according to an embodiment of the present invention as seen from diagonally above.

Before the description of the present invention proceeds, it is noted that like parts are designated by like reference numerals throughout the accompanying drawings.

In the following, with reference to the drawings, a description will be given of embodiment of the present invention.

Embodiment

Figure 2:
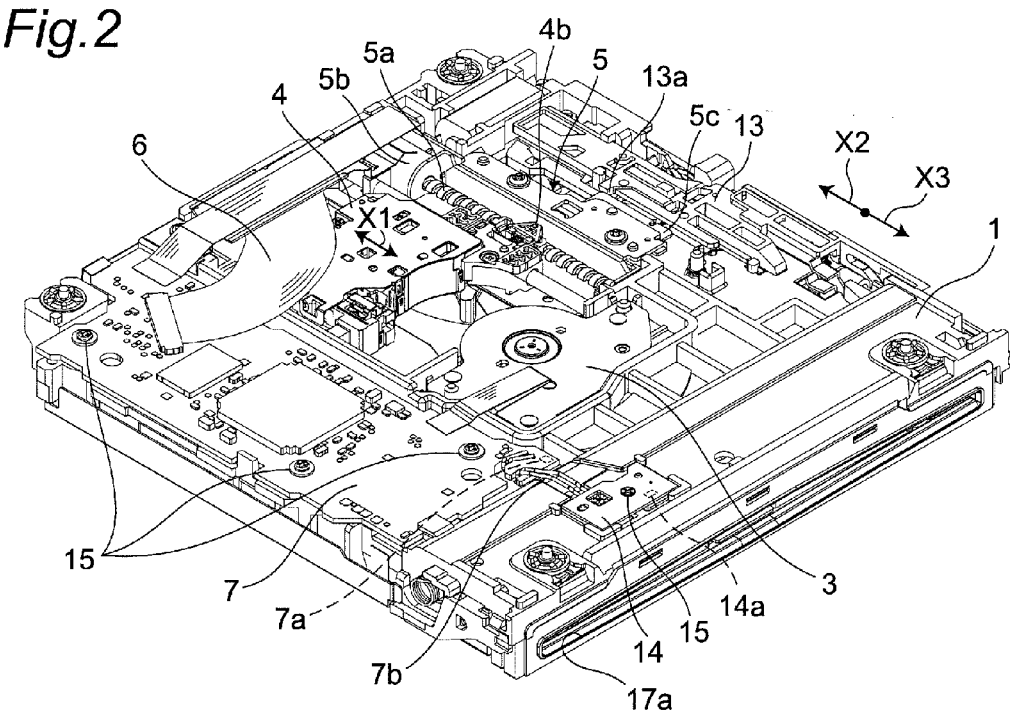
FIG. 2 is a perspective view of the optical disc device according to the embodiment of the present invention as seen from diagonally below.
Figure 3:
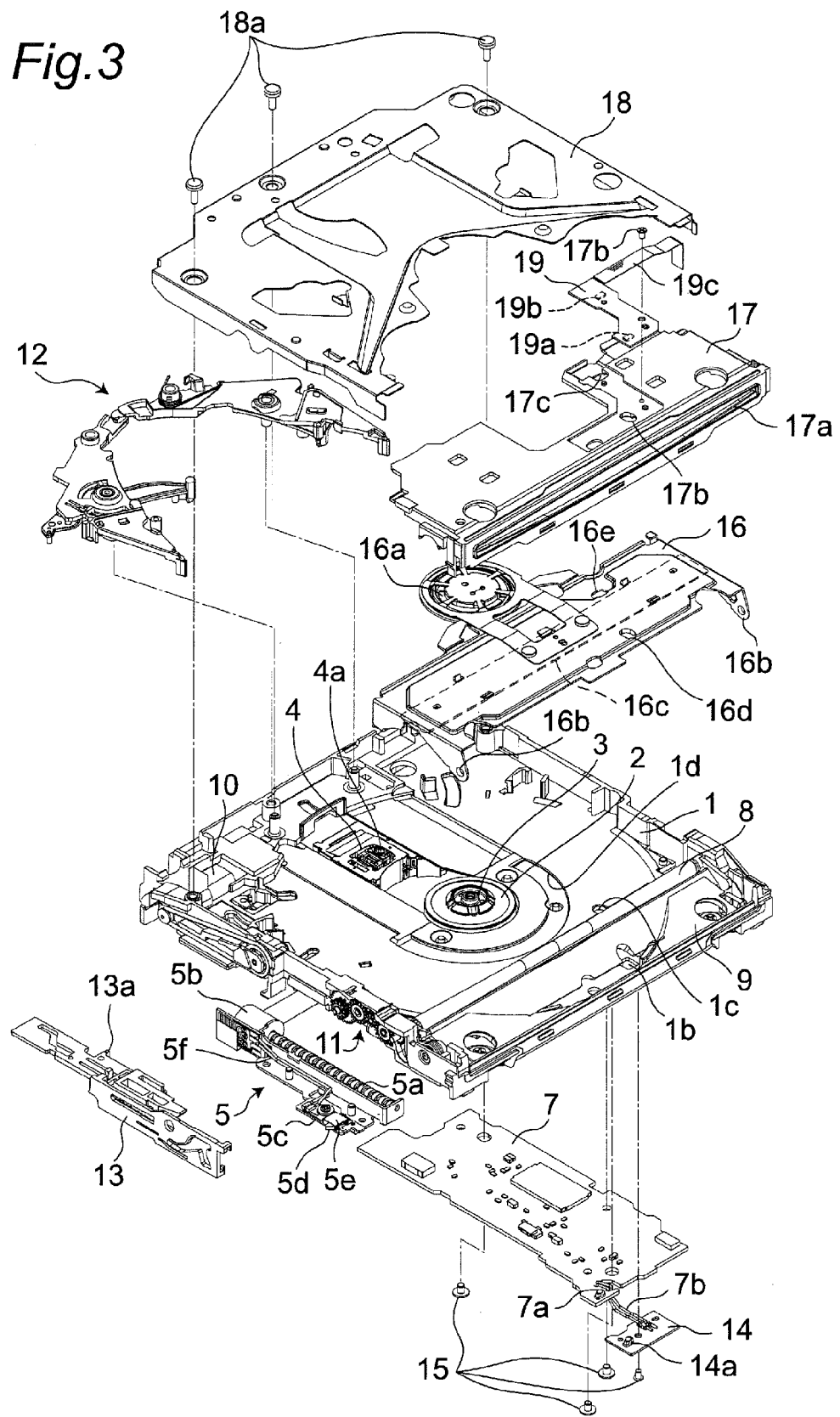
FIG. 3 is an exploded perspective view of the optical disc device according to the embodiment of the present invention.

With reference to FIGS. 1 to 3, a description will be given of the overall structure of an optical disc device according to an embodiment of the present invention. FIG. 1 is a perspective view of the optical disc device according to the embodiment of the present invention as seen from diagonally above. FIG. 2 is a perspective view of the optical disc device as seen from diagonally below. FIG. 3 is an exploded perspective view of the optical disc device according to the embodiment of the present invention. It is noted that, though the description will proceed based on the premise that the top side of FIG. 1 is the top side of the optical disc device and the bottom side of FIG. 1 is the bottom side of the optical disc device for the sake of convenience, the present invention is not limited thereto. For example, the optical disc device may be arranged as being tilted by 90°.

The optical disc device according to the present embodiment is a slot-in scheme disc device that carries an optical disc such as a CD or a DVD to the recording and reproducing position, without through the use of a tray. In FIGS. 1 to 3, the optical disc device according to the present embodiment includes a chassis (also referred to as a mechanical base) 1 that retains the components. The chassis 1 is provided with a spindle motor 3 that rotates a turntable 2 on which the optical disc is placed, an optical head 4 that performs recording or reproduction of information on or from the optical disc, and an optical head carrying mechanism 5 that carries the optical head 4 in the radial direction (also referred to as the track direction) X1 with reference to the optical disc.

The optical head 4 records information on the optical disc by emitting light from an objective lens 4a to the optical disc placed on the turntable 2. Further, the optical head 4 reproduces information recorded on the optical disc by emitting light from the objective lens 4a to the optical disc placed on the turntable 2 and detecting the reflected light from the optical disc. As shown in FIG. 2, the optical head 4 is electrically connected to the drive substrate 7 via an FPC (flexible printed circuit board) 6. The drive substrate 7 is equipped with electronic components (i.e., a control circuit) such as an LSI that controls operations such as the carrying operation of the optical head 4.

The optical head carrying mechanism 5 is provided with a feed shaft 5a and a traverse motor 5b that rotates the feed shaft 5a. A spiral groove is formed at the feed shaft 5a, and a nut plate 4b integrally provided at the optical head 4 is fitted to the groove. As the traverse motor 5b rotates the feed shaft 5a, the nut plate 4b shifts in the longitudinal direction of the feed shaft 5a. Thus, the optical head 4 is carried in the radial direction X1. Further, the optical head carrying mechanism 5 includes a switch substrate 5c. The switch substrate 5c is equipped with a mechanical switch 5e, which is an exemplary attachment detecting sensor provided with an actuator 5d. The mechanical switch 5e is electrically connected to the drive substrate 7 via the wire member 5f.

Further, the chassis 1 is provided with a roller lever 9 that rotatably holds a roller 8, a loading motor 10 that generates driving force for rotating the roller 8, and a gear group 11 that transmits the driving force of the loading motor 10 to the roller 8.

The gear group 11 is structured by a plurality of gears rotatably pivoted at the sidewall of the chassis 1. In the state where the optical disc is brought into contact with the roller 8, by the roller 8 being rotated by the driving force of the loading motor 10 transmitted to the roller 8 via the gear group 11, the optical disc is carried in the disc carrying directions X2 and X3.

Further, the chassis 1 is provided with a lever group 12 structured by a plurality of levers and a cam rod 13.

The lever group 12 is brought into contact with an outer edge portion of the optical disc carried into the device, thereby guiding the optical disc such that the central hole of the optical disc is positioned in close proximity to the turntable 2. Further, when the central hole of the optical disc is positioned in close proximity to the turntable 2, the lever group 12 shifts the cam rod 13 in the disc ejecting direction X3 via a not-shown trigger member. In the following, such a shifting of the cam rod 13 is referred to as the "initial shift".

The cam rod 13 is provided so as to be shiftable in the disc carrying directions X2 and X3 relative to the chassis 1. When the cam rod 13 is initially shifted by the lever group 12, a rack (not shown) provided to the cam rod 13 meshes with one of the gears out of the gear group 11. In this state, the driving force of the loading motor 10 is transmitted to the gear group 11, and the rotation of the gears of the gear group 11 causes the cam rod 13 to further shift in the disc ejecting direction X3. Using the shifting force of the cam rod 13, a clamp lever 16 whose description will follow rotates, whereby the optical disc is attached onto the turntable 2, and the roller lever 9 rotates to cause the roller 8 to leave the optical disc. Thus, it becomes possible to rotate the optical disc, to perform the recording or reproduction of information on or from the optical disc.

Further, the cam rod 13 is provided with a rib 13a that can be brought into contact with the actuator 5d of the mechanical switch 5e. When the cam rod 13 shifts in the disc ejecting direction X3 by the rotation of the gears of the gear group 11, the rib 13a is brought into contact with the actuator 5d, whereby the actuator 5d enters ON state (i.e., the electrically short-circuited state). It is noted that, when the rib 13a is not in contact with the actuator 5d, the actuator 5d is in OFF state. The information of ON/OFF state of the actuator 5d is transmitted to the drive substrate 7 via the wire member 5d.

The drive substrate 7 is equipped with a light receiving element (second light receiving element) 7a of a transmission-type photo interrupter, which is an exemplary ejection detection optical sensor detecting that the optical disc is ejected to a disc insert slit 17a. Further, to the drive substrate 7, a sensor substrate 14 is connected via a wire member 7b. The sensor substrate 14 is equipped with a light receiving element (first light receiving element) 14a of a transmission-type photo interrupter, which is an exemplary insertion detection optical sensor detecting that the optical disc is inserted into the disc insert slit 17a. The drive substrate 7 and the sensor substrate 14 are fixed to the bottom face of the chassis 1 by a plurality of screws 15.

Further, the chassis 1 is provided with the clamp lever 16, a cover 17, and a sub-base 18.

The clamp lever 16 rotatably holds a clamper 16a that clamps the optical disc onto the turntable 2. Further, the clamp lever 16 is provided so as to be rotatable about holes 16b provided at respective opposite ends on the upstream side in the disc insert direction X2. When the optical disc is carried so that the central hole of the optical disc is positioned in close proximity to the turntable 2 and the cam rod 13 shifts in the disc ejecting direction X3 by the rotation of the gears of the gear group 11, the cam rod 13 and the clamp lever 16 engage with each other, and the clamp lever 16 rotates. By the rotation of the clamp lever 16, the clamper 16a clamps the optical disc onto the turntable 2. It is noted that, by the clamp lever 16 being rotated from this state in the reverse direction, the clamped state of the optical disc by the clamper 16a is released. Then, the clamper 16a recedes so that the clamper 16a will not be brought into contact with the optical disc while the optical disc is carried.

At the bottom face of the clamp lever 16, a guide member 16c that guides carrying of the optical disc in the carrying directions X2 and X3 is provided. The optical disc is carried in the carrying directions X2 and X3, by the rotation of the roller 8 in the state where the optical disc is interposed between the roller 8 and the guide member 16c.

The cover 17 is provided at a higher level than the clamp lever 16. The cover 17 is provided with the disc insert slit 17a into and from which the optical disc is inserted and ejected. At the top face of the cover 17, a sensor substrate 19 is fixed by a screw 17b.

The sensor substrate 19 is equipped with a light emitting element (first light emitting element) 19a of a transmission-type photo interrupter, which is an exemplary insertion detection optical sensor, at the position opposing to the light receiving element 14a of the sensor substrate 14. Further, the sensor substrate 19 is equipped with a light emitting element (second light emitting element) 19b of a transmission-type photo interrupter, which is an exemplary ejection detection optical sensor, at the position opposing to the light receiving element 7a of the drive substrate 7.

At the cover 17, the clamp lever 16, and the chassis 1, through holes 17b, 16d, and 1b are respectively formed so that the light of the light emitting element 19a is received by the light receiving element 14a. Further, at the cover 17, the clamp lever 16, and the chassis 1, through holes 17c, 16e, and 1c are respectively provided so that the light of the light emitting element 19b is received by the light receiving element 7a.

In the following, the transmission-type photo interrupters respectively structured by the light receiving element 14a and the light emitting element 19a are referred to as the F sensors (F stands for Front) 14a and 19a. Further, the transmission-type photo interrupters respectively structured by the light receiving element 7a and the light emitting element 19b are referred to as B sensors (B stands for Back) 7a and 19b.

When the light receiving element 14a receives the light of the light emitting element 19a, the F sensors 14a and 19a are in OFF state. Further, when the light receiving element 14a does not receive the light of the light emitting element 19a because of, for example, the optical disc being positioned between the light receiving element 14a and the light emitting element 19a, the F sensors 14a and 19a are in ON state. Similarly, when the light receiving element 7a receives the light of the light emitting element 19b, the B sensors 7a and 19b are in OFF state. Further, when the light receiving element 7a does not receive the light from the light emitting element 19b because of, for example, the optical disc being positioned between the light receiving element 7a and the light emitting element 19b, the B sensors 7a and 19b are in ON state.

Further, the sensor substrate 19 is electrically connected to the drive substrate 7 via the FFC (flexible flat cable) 19c. The information of ON/OFF state of the F sensors 14a and 19a and the B sensors 7a and 19b is transmitted to the drive substrate 7 via the FFC 19c and the wire member 7b.

The sub-base 18 is provided at a level higher than the lever group 12, and is fixed to the chassis 1 by a plurality of screws 18a. The center portion of the sub-base 18 serves as the guide of the optical disc when the optical disc is carried.

Figure 4:
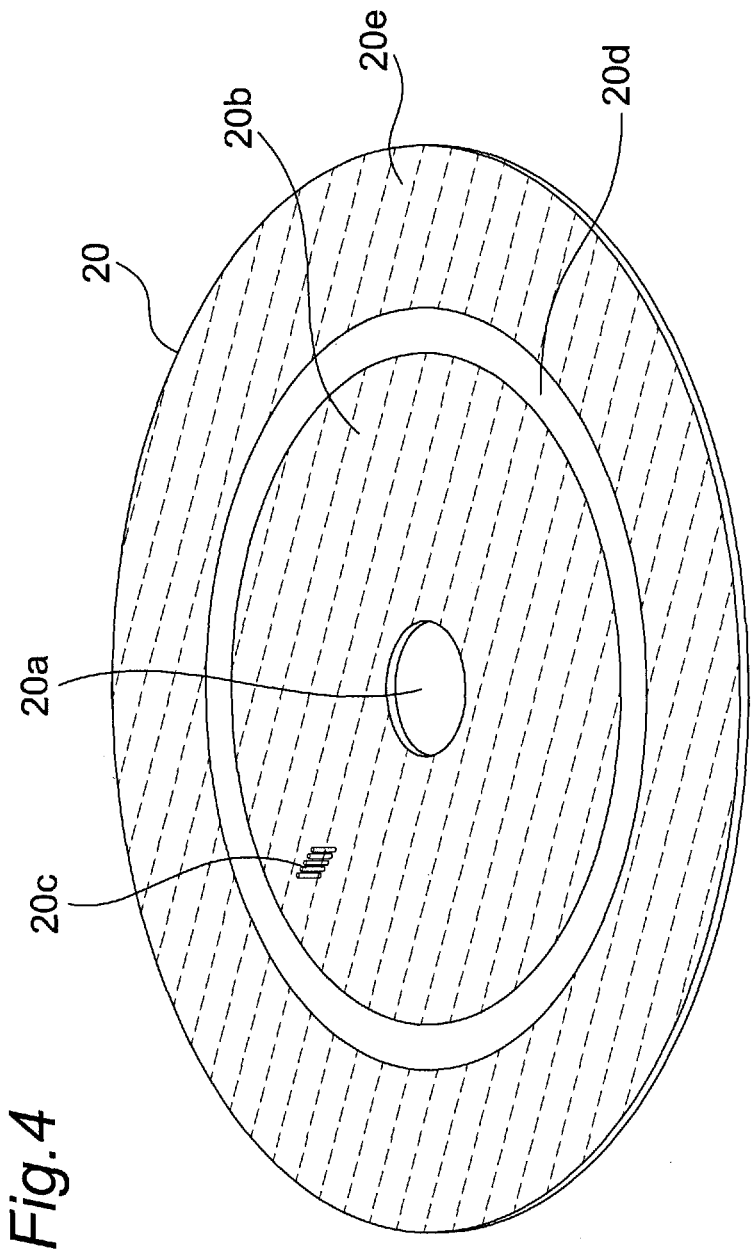
FIG. 4 is a perspective view of a lens cleaner.
Figure 5:
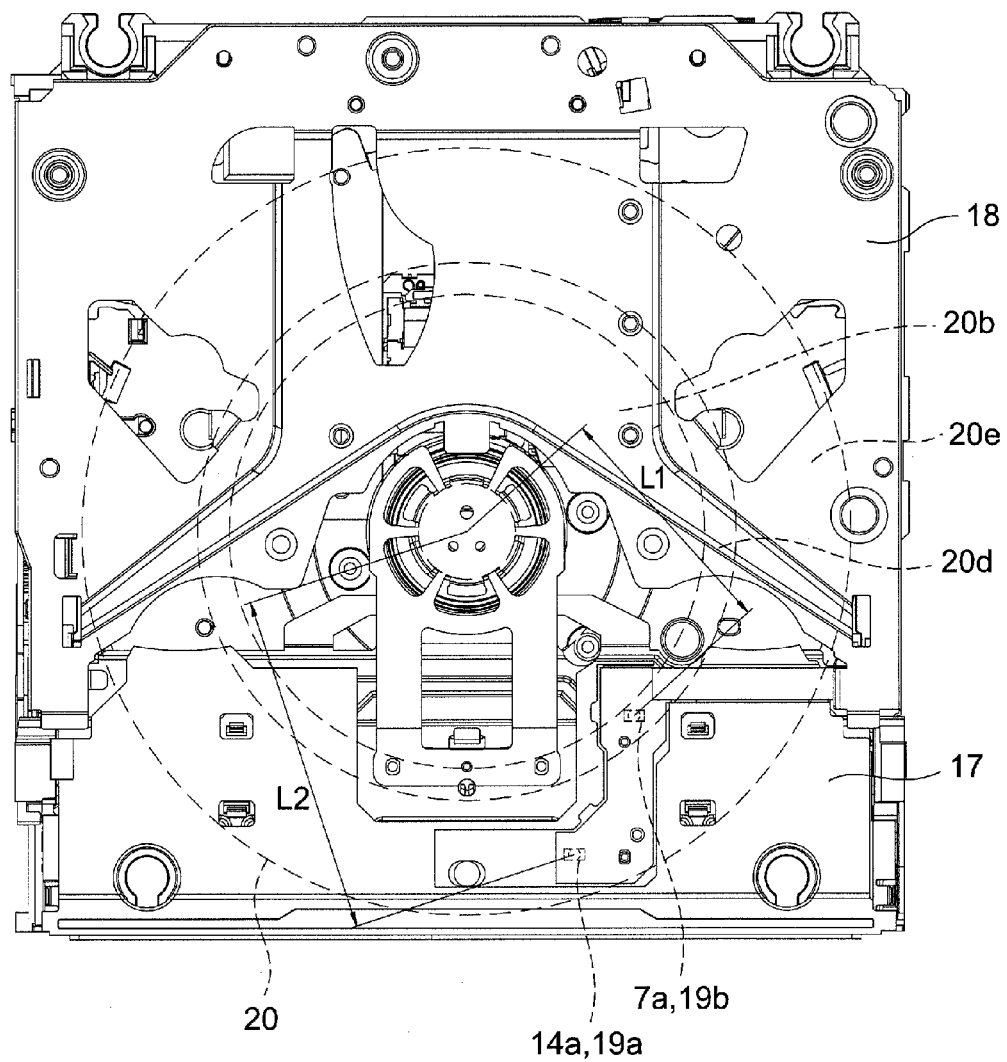
FIG. 5 is a plan view showing the state in which the lens cleaner is attached onto a turntable of the optical disc device according to the embodiment of the present invention.

Next, with reference to FIGS. 4 and 5, a description will be given of the structure of the lens cleaner that cleans the objective lens 4a of the optical head 4. FIG. 4 is a perspective view of the lens cleaner. FIG. 5 is a plan view showing the state in which the lens cleaner 20 is attached onto the turntable 2 of the optical disc device according to the present embodiment.

In FIG. 4, the lens cleaner 20 is formed to be disc-like. In the present embodiment, the lens cleaner 20 is formed to be substantially identical to the large-diameter disc (e.g., an optical disc whose standard diameter is 12 cm) in shape and size. Accordingly, the lens cleaner 20 can be carried into the optical disc device in the similar manner as the large-diameter disc. The lens cleaner 20 is provided with a central hole 20a. Around the central hole 20a, an annular first light blocking portion 20b that blocks the light from the F sensors 14a and 19a and the B sensors 7a and 19b is provided. On the surface of the first light blocking portion 20b, a brush 20c being an exemplary cleaning member cleaning the objective lens 4a is provided. Around the first light blocking portion 20b, an annular light transmitting portion 20d that transmits the light from the F sensors 14a and 19a and the B sensors 7a and 19b is provided. Around the light transmitting portion 20d, an annular second light blocking portion 20e that blocks the light from the F sensors 14a and 19a and the B sensors 7a and 19b is provided.

As shown in FIG. 5, the light transmitting portion 20d is provided at the position opposing to the B sensors 7a and 19b when the lens cleaner 20 is attached onto the turntable 2. For example, when the distance L1 from the center of the turntable 2 to the center of the B sensors 7a and 19b is 44 mm, the light transmitting portion 20d is provided at the position where the distance from the center of the lens cleaner 20 ranges from 41 mm to 48 mm.

Further, the second light blocking portion 20e is provided at the position opposing to the F sensors 14a and 19a when the lens cleaner 20 is attached onto the turntable 2. For example, when the distance L2 from the center of the turntable 2 to the center of the F sensors 14a and 19a is 55 mm, the second light blocking portion 20e is provided at the position where the distance from the center of the lens cleaner 20 ranges from 48 mm to 60 mm.

It is noted that the first light blocking portion 20b and the second light blocking portion 20e do not have any reproduction signal of a CD, a DVD or the like.

Next, with reference to FIGS. 6 to 14, a description will be given of the operation of the optical disc device according to the present embodiment. It is noted that, the operations of the optical disc device according to the present embodiment are controlled by electronic components (i.e., a control circuit) such as an LSI installed in the drive substrate 7.

Figure 6:
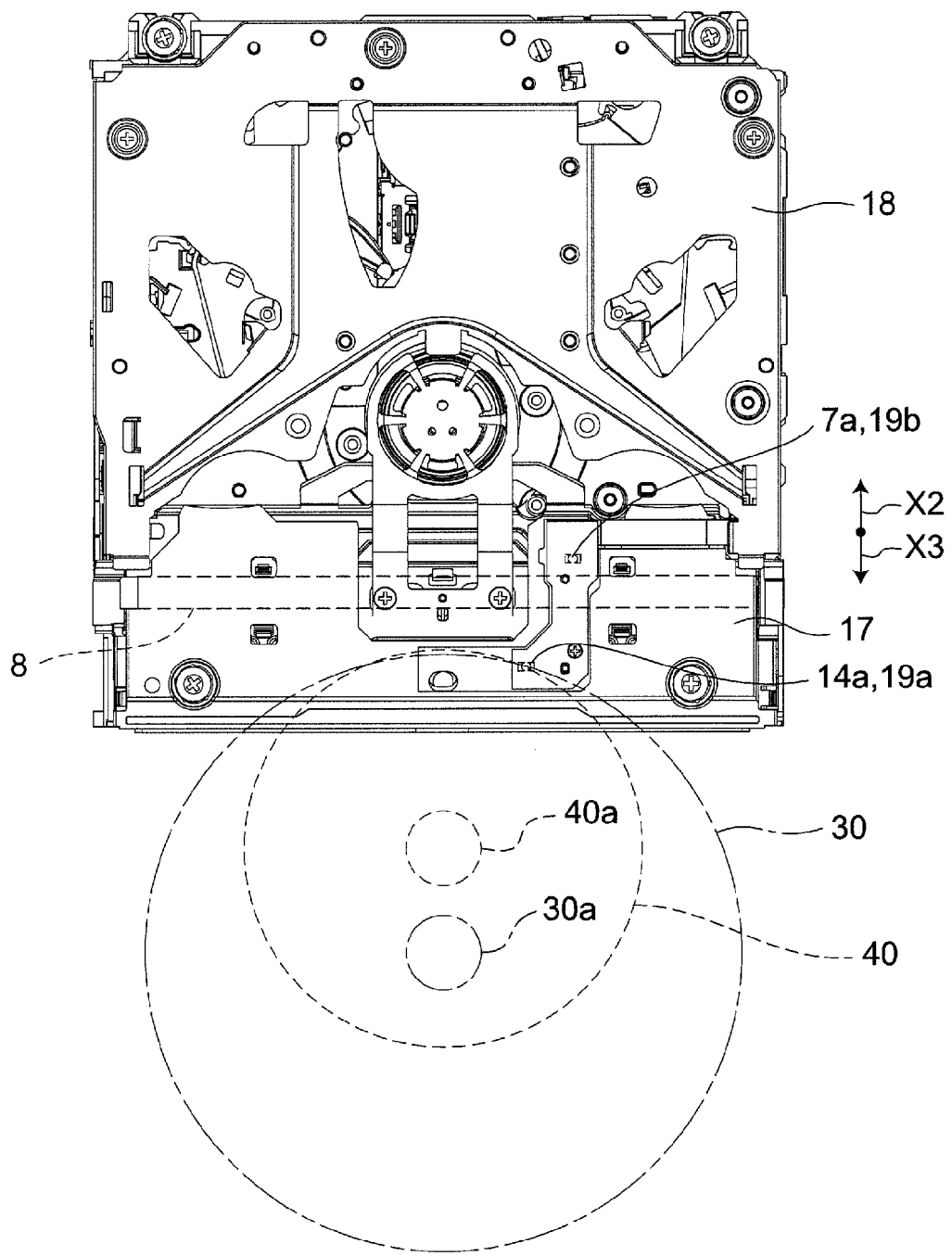
FIG. 6 is a top view showing the state of components when F sensors (insertion detection optical sensors) detect that a large-diameter disc or a small-diameter disc is inserted into a disc insert slit in the optical disc device according to the embodiment of the present invention.
Figure 7:
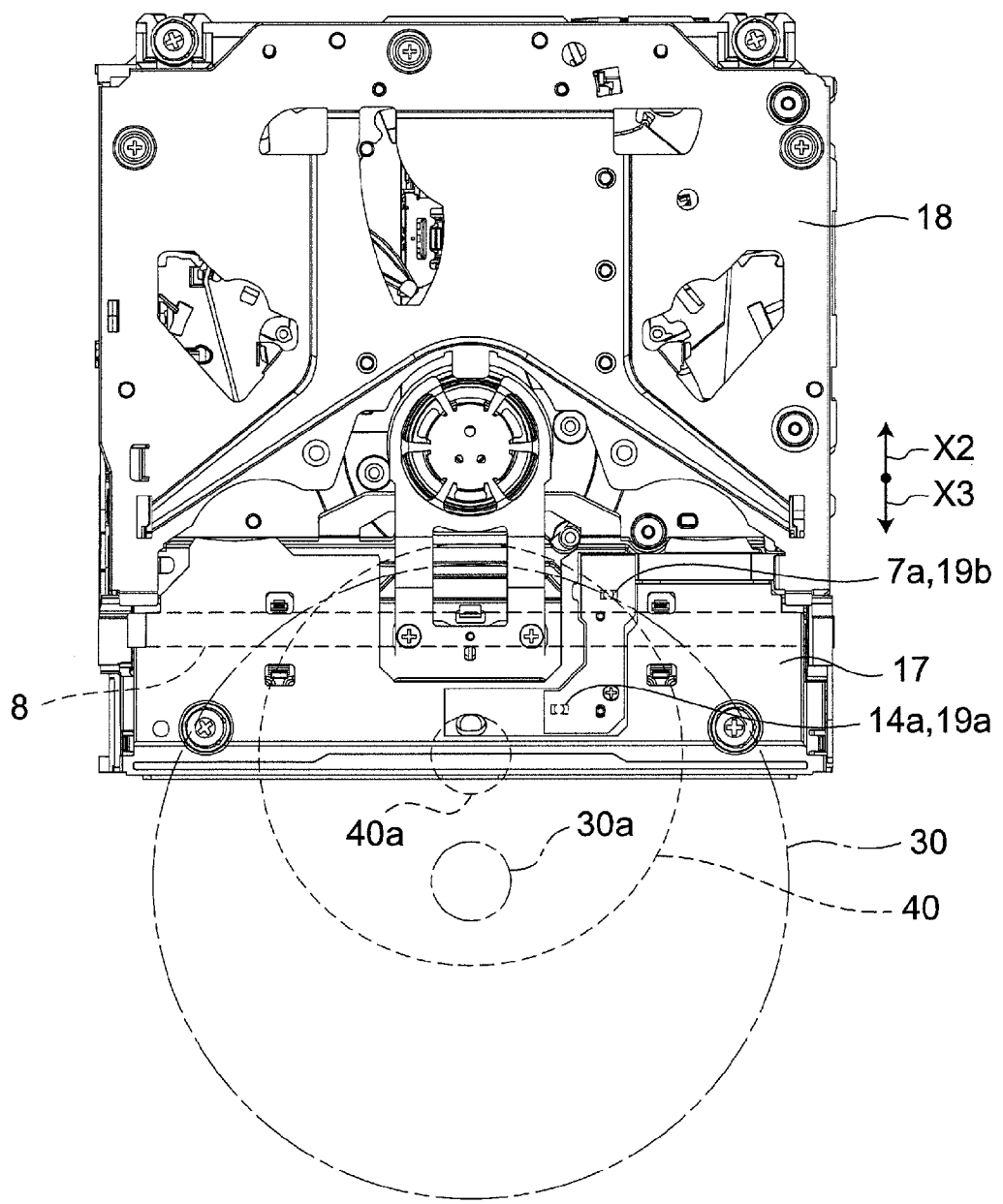
FIG. 7 is a top view showing the state of components when B sensors (ejection detection optical sensors) detect that the large-diameter disc or the small-diameter disc is ejected from the disc insert slit in the optical disc device according to the embodiment of the present invention.
Figure 8:
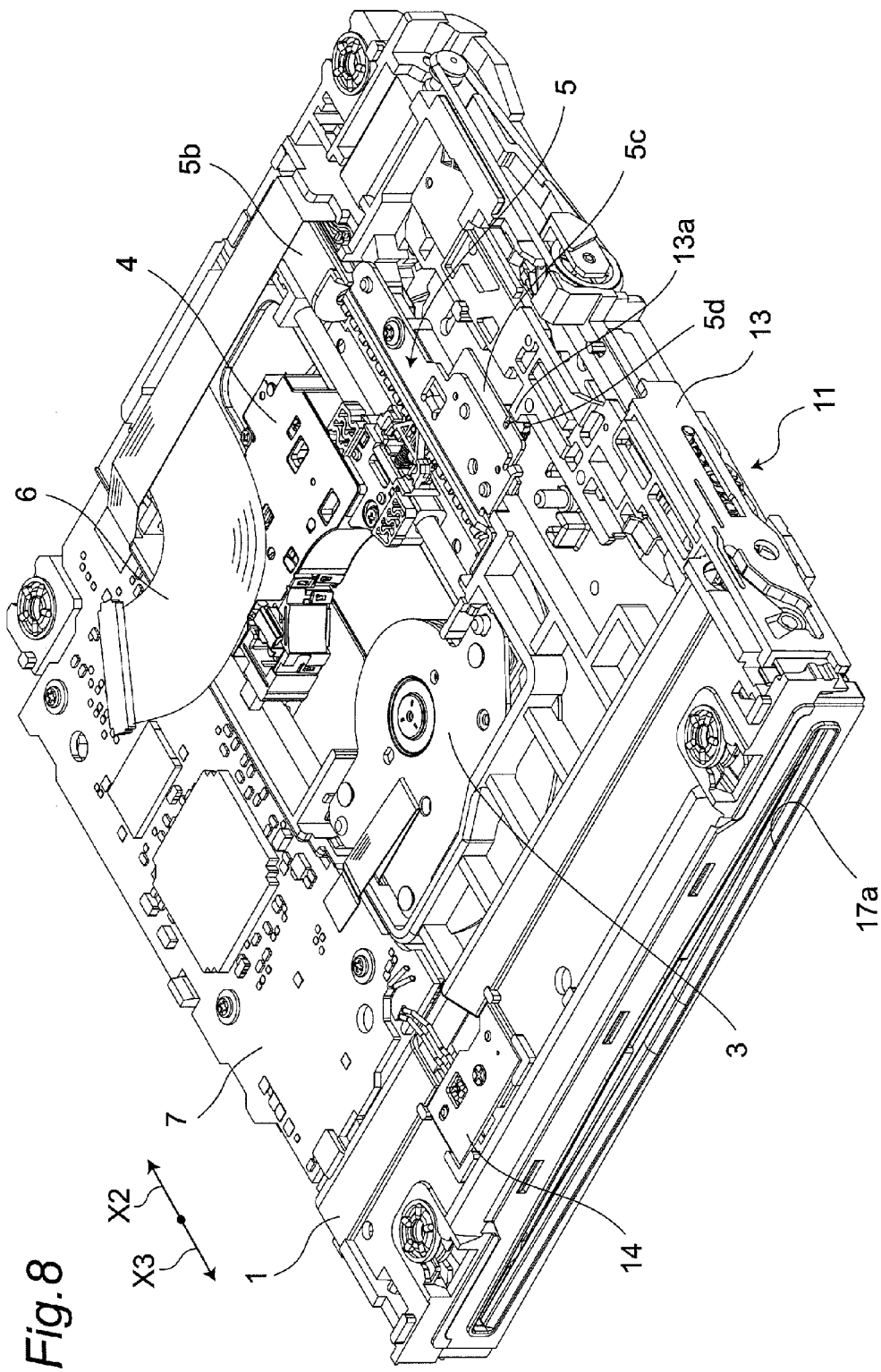
FIG. 8 is a perspective view of the state where the large-diameter disc, the small-diameter disc, or the disc cleaner is attached onto the turntable in the optical disc device according to the embodiment of the present invention as seen from diagonally below.
Figure 9:
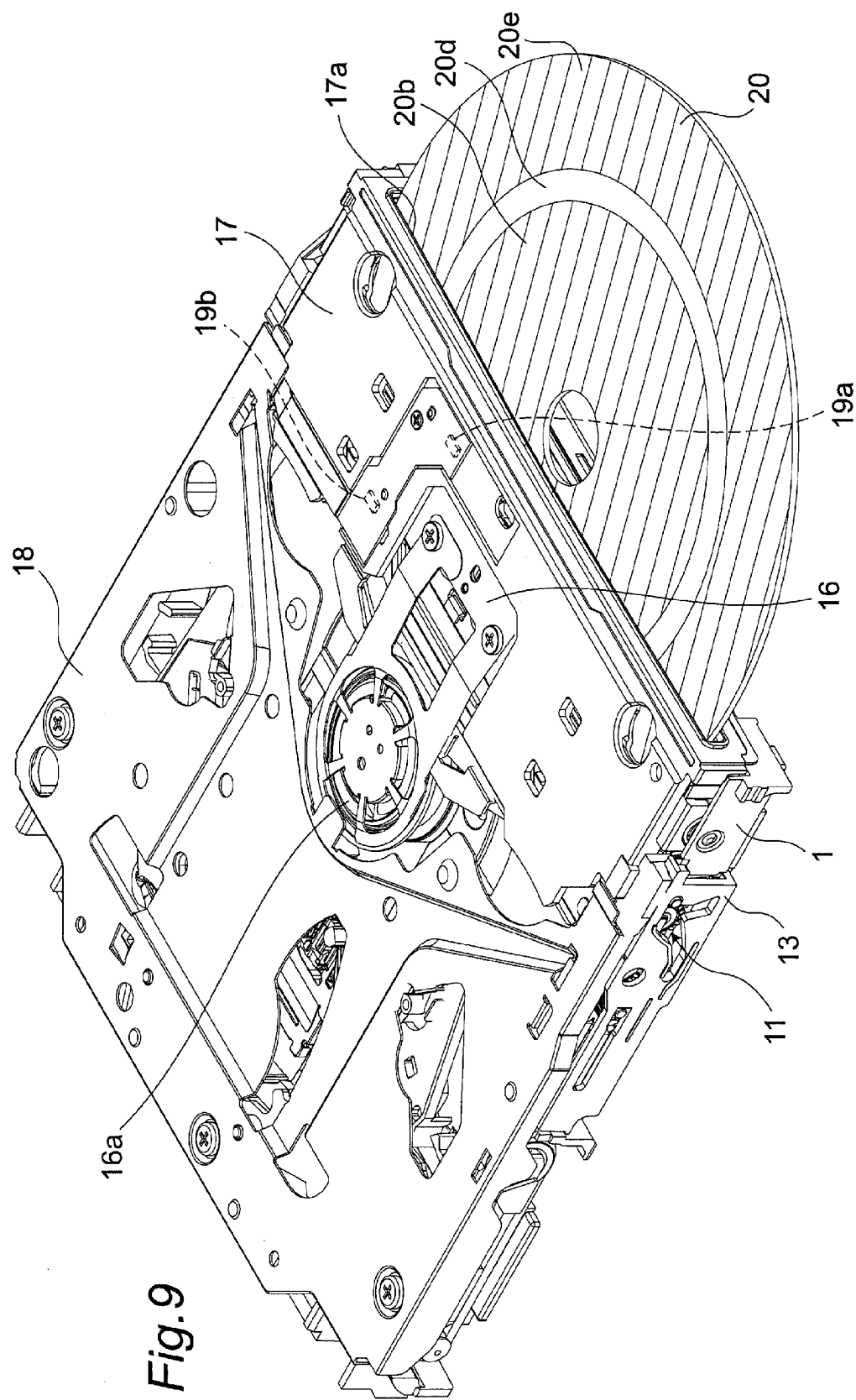
FIG. 9 is a perspective view showing the state of the lens cleaner midway through being carried to the optical disc device according to the embodiment of the present invention.
Figure 10:
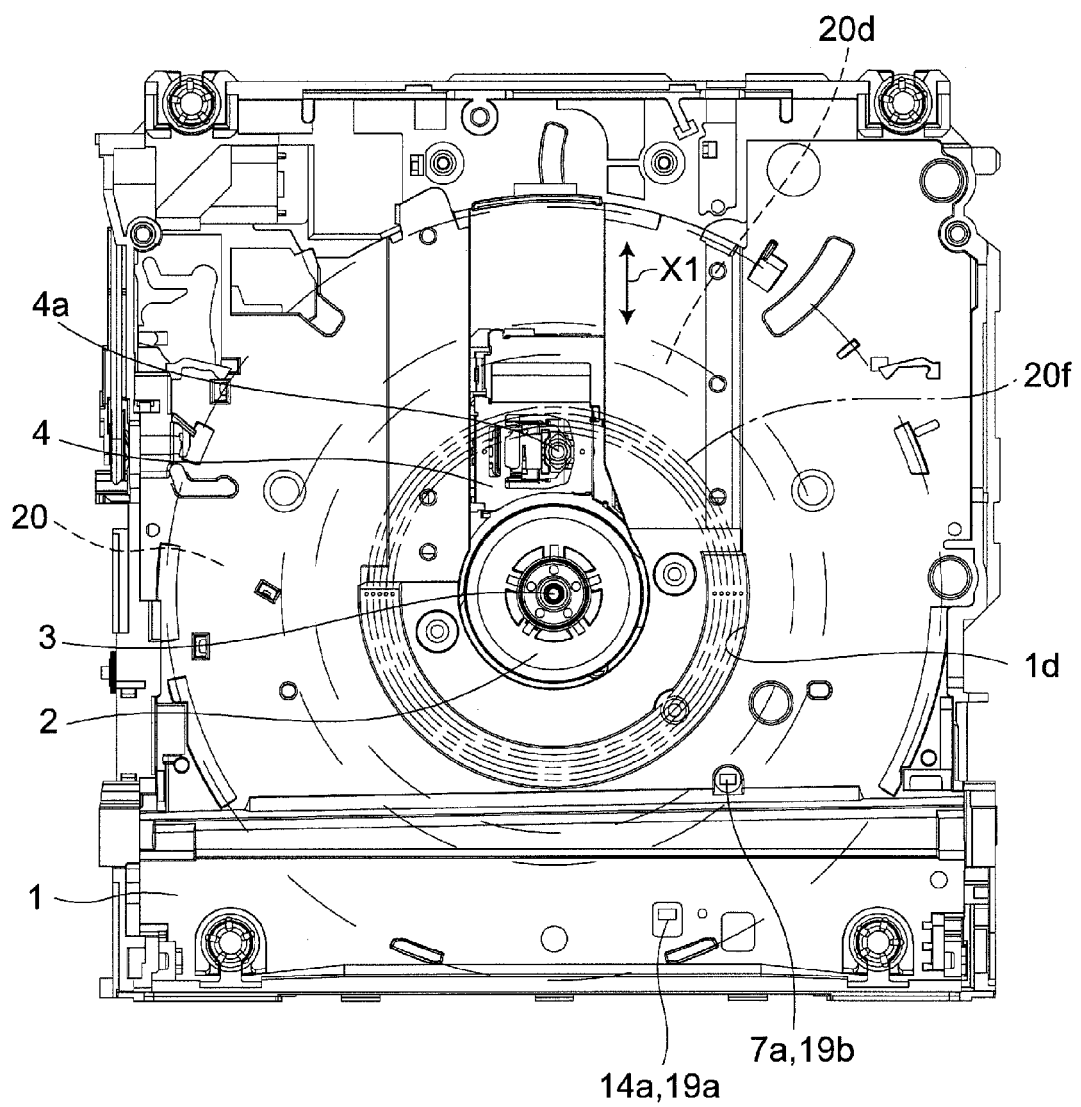
FIG. 10 is an explanatory illustration showing the manner of the lens cleaner cleaning the objective lens of the optical head.
Figure 11:
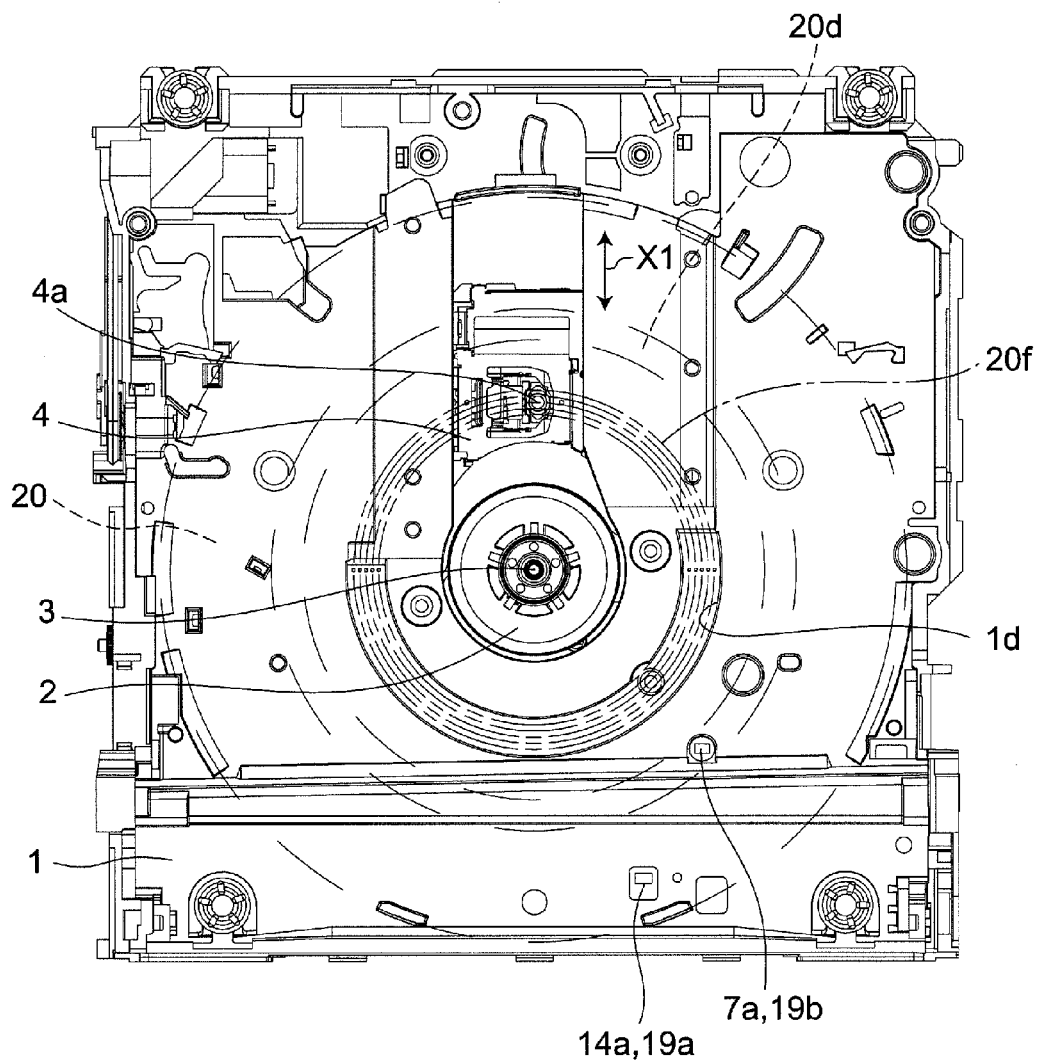
FIG. 11 is an explanatory illustration showing the manner of the lens cleaner cleaning the objective lens of the optical head.
Figure 12:
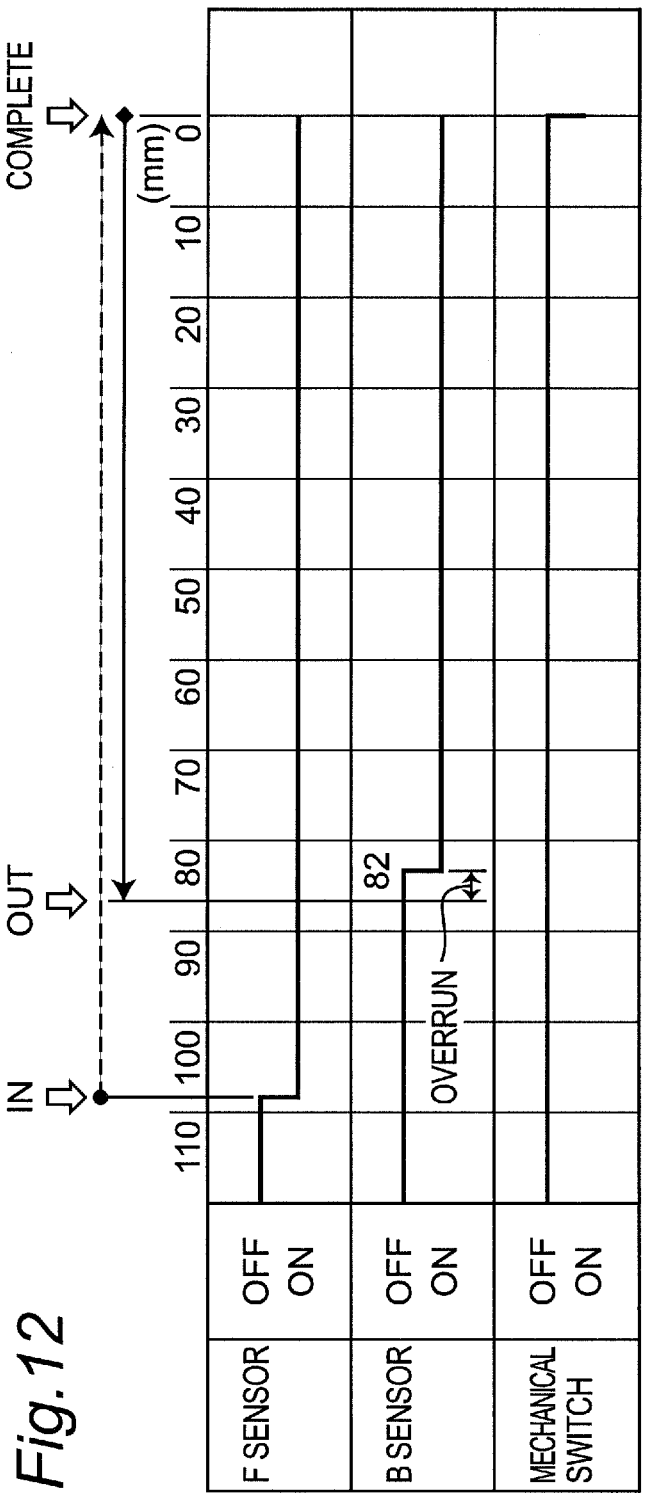
FIG. 12 is a timing chart showing the ON/OFF state of the F sensors, the B sensors, and a mechanical switch (attachment detecting sensor) when the large-diameter disc is carried in and ejected.
Figure 13:
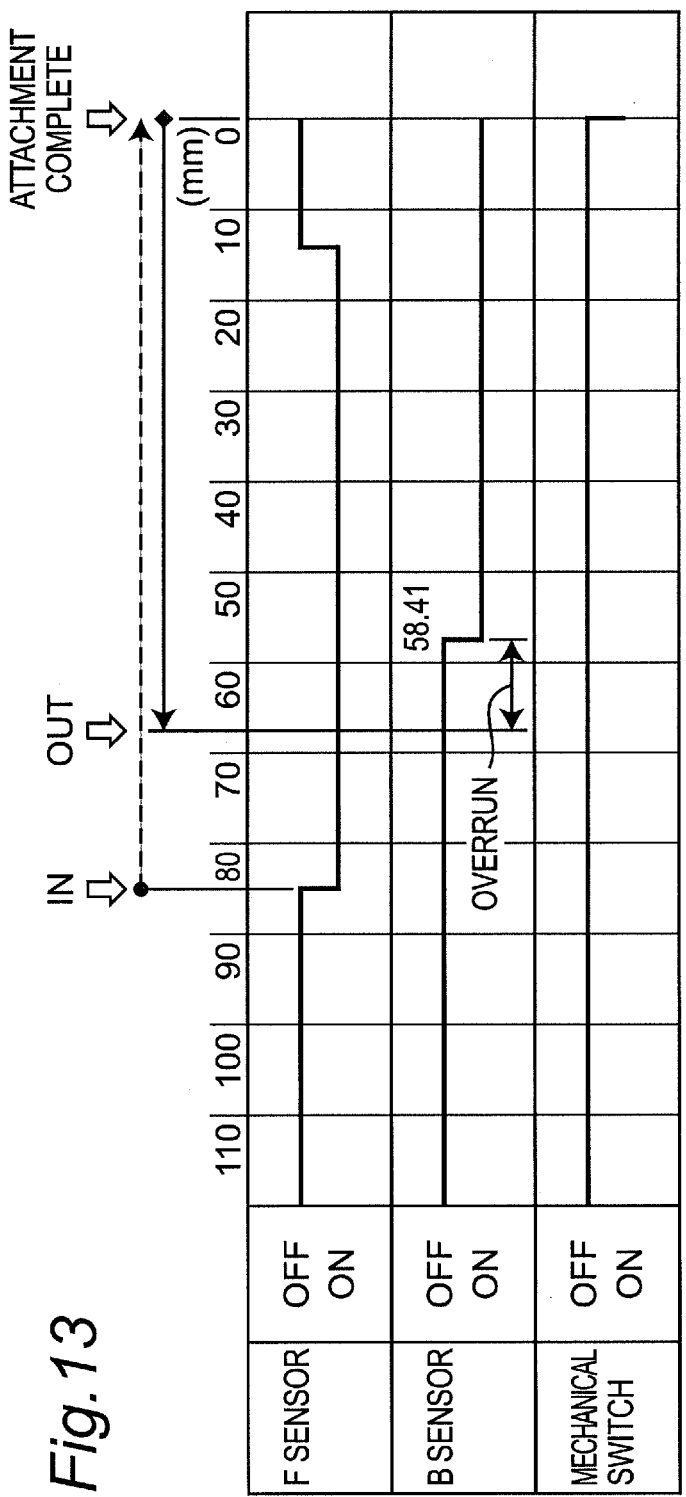
FIG. 13 is a timing chart showing the ON/OFF state of the F sensors, the B sensors, and the mechanical switch when the small-diameter disc is carried in and ejected.
Figure 14:
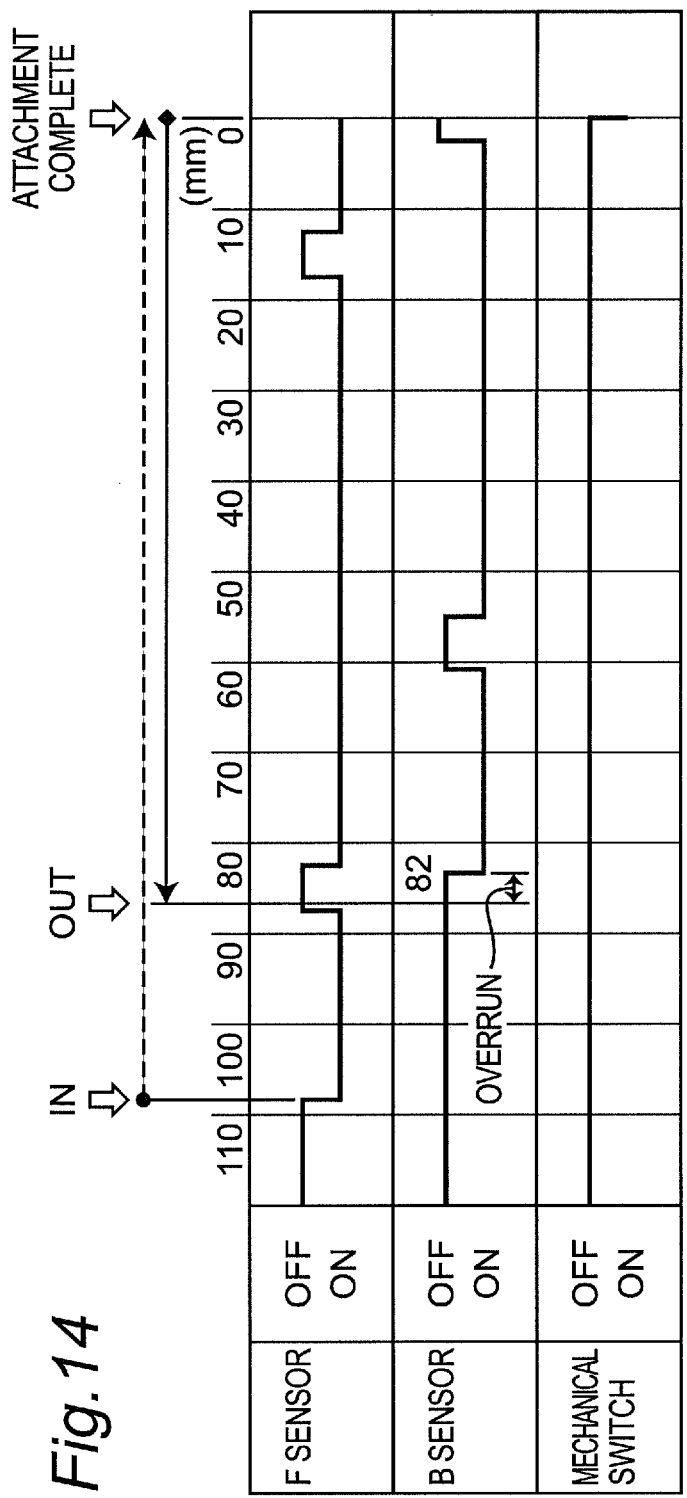
FIG. 14 is a timing chart showing the ON/OFF state of the F sensors, the B sensors, and the mechanical switch when the lens cleaner is carried in and ejected.

FIG. 6 is a top view showing the state of the components when the F sensors 14a and 19a detect that a large-diameter disc (e.g., an optical disc whose standard diameter is 12 cm) 30 or a small-diameter disc (e.g., an optical disc whose standard diameter is 8 cm) 40 is inserted into the disc insert slit 17a. FIG. 7 is a top view showing the state of the components when the B sensors 7a and 19b detect that the large-diameter disc 30 or the small-diameter disc 40 is ejected from the disc insert slit 17a. FIG. 8 is a perspective view showing the state where the large-diameter disc 30, the small-diameter disc 40, or the disc cleaner 20 is attached onto the turntable 2 as seen from diagonally below. FIG. 9 is a perspective view showing the state of the lens cleaner 20 midway through being carried to the optical disc device according to the present embodiment. FIGS. 10 and 11 are each an explanatory illustration showing the manner of the lens cleaner 20 cleaning the objective lens 4a of the optical head 4. FIG. 12 is a timing chart showing the ON/OFF state of the F sensors 14a and 19a, the B sensors 7a and 19b, and the mechanical switch 5e when the large-diameter disc 30 is carried in and ejected. FIG. 13 is a timing chart showing the ON/OFF state of the F sensors 14a and 19a, the B sensors 7a and 19b, and the mechanical switch 5e when the small-diameter disc 40 is carried in and ejected. FIG. 14 is a timing chart showing the ON/OFF state of the F sensors 14a and 19a, the B sensors 7a and 19b, and the mechanical switch 5e when the lens cleaner 20 is carried in and ejected. It is noted that, in FIGS. 12 to 14, the horizontal axis indicates the distance from the center of the turntable 2 to the center of the large-diameter disc 30, the small-diameter disc 40, or the lens cleaner 20.

Firstly, with reference to FIGS. 3, 6, 8, and 12, a description will be given of the carry-in operation of the large-diameter disc 30.

When the large-diameter disc 30 is inserted into the disc insert slit 17a and the large-diameter disc 30 arrives at the position opposing to the F sensors 14a and 19a, the F sensors 14a and 19a enter ON state. Thus, the loading motor 10 is driven, and the driving force of the loading motor 10 is transmitted to the roller 8 via the gear group 11, whereby the roller 8 rotates. In this state, when the large-diameter disc 30 is further inserted, the large-diameter disc 30 is held between the roller 8 and the guide member 16c of the clamp lever 16, and is carried in the disc carry-in direction X2.

When the large-diameter disc 30 is carried in the disc carry-in direction X2, the outer edge portion of the large-diameter disc 30 is brought into contact with the lever group 12, and the large-diameter disc 30 is guided by the lever group 12 so that the central hole 30a is positioned in the close proximity to the turntable 2.

When the central hole 30a of the large-diameter disc 30 shifts to close proximity to the turntable 2, the lever group 12 causes the cam rod 13 to perform the initial shift. By the initial shift, the rack of the cam rod 13 meshes with one of the gears out of the gear group 11 rotated by the driving force of loading motor 10, and then the cam rod 13 further shifts in the disc ejecting direction X3.

By the shifting of the cam rod 13, the clamp lever 16 rotates and the large-diameter disc 30 is attached onto the turntable 2, and the roller lever 9 rotates and the roller 8 leaves the large-diameter disc 30. Further, at this timing, as shown in FIG. 8, the rib 13a of the cam rod 13 is brought into contact with the actuator 5d of the mechanical switch 5e, whereby the mechanical switch 5e enters ON state. Thus, the spindle motor 3 is driven to rotate the turntable 2, and recording or reproduction of information on or from the large-diameter disc 30 is performed. At this time, the F sensors 14a and 19a and the B sensors 7a and 19b are in ON state as shown in FIG. 12 because the light is blocked by the large-diameter disc 30.

Next, with reference to FIGS. 3, 7, and 12, a description will be given of the eject operation of the large-diameter disc 30.

When start of the eject operation of the large-diameter disc 30 is instructed by, e.g., the eject button (not shown) being pushed, the loading motor 10 is driven in the direction which is reverse to that in the carry-in mode. The reverse driving force of the loading motor 10 is transmitted to the roller 8 via the gear group 11, and the roller 8 rotates in the reverse direction. Further, the cam rod 13 shifts in the disc insert direction X2 by the gear group 11 that rotates in the reverse direction by the reverse driving force of the loading motor 10. By the shifting of the cam rod 13 in the disc insert direction X2, the rib 13a of the cam rod 13 and the actuator 5d of the mechanical switch 5e become away from each other, and the mechanical switch 5e enters OFF state. Further, by the shifting of the cam rod 13 in the disc insert direction X2, the clamp lever 16 rotates in the reverse direction, whereby the attached state of the large-diameter disc 30 onto the turntable 2 is released and the roller lever 9 rotates in the reverse direction, whereby the roller 8 is brought into contact with the large-diameter disc 30. Thus, the large-diameter disc 30 receives the rotation force of the roller 8 in the reverse direction and is carried in the disc ejecting direction X3.

When the large-diameter disc 30 passes through the position where the large-diameter disc 30 opposes to the B sensors 7a and 19b (see FIG. 7), the B sensors 7a and 19b enter OFF state because the light is not blocked by the large-diameter disc 30. Thus, driving of the loading motor 10 in the reverse direction stops, whereby the reverse rotation of the roller 8 stops. As a result, the large-diameter disc 30 is held in the state held between the roller 8 and the guide member 16c of the clamp lever 16, at the slightly overrun position from the position where the B sensors 7a and 19b have entered OFF state.

Next, with reference to FIGS. 3, 6, 8, and 13, a description will be given of the carry-in operation of the small-diameter disc 40.

When the small-diameter disc 40 is inserted into the disc insert slit 17a and the small-diameter disc 40 arrives at the position opposing to the F sensors 14a and 19a, the F sensors 14a and 19a enter ON state. Thus, the loading motor 10 is driven, and the driving force of the loading motor 10 is transmitted to the roller 8 via the gear group 11, whereby the roller 8 rotates. In this state, when the small-diameter disc 40 is further inserted, the small-diameter disc 40 is held between the roller 8 and the guide member 16c of the clamp lever 16, and is carried in the disc carry-in direction X2.

When the small-diameter disc 40 is carried in the disc carry-in direction X2, the outer edge portion of the small-diameter disc 40 is brought into contact with the lever group 12, and the small-diameter disc 40 is guided by the lever group 12 so that the central hole 30a is positioned in the close proximity to the turntable 2.

When the central hole 40a of the small-diameter disc 40 shifts to close proximity to the turntable 2, the lever group 12 causes the cam rod 13 to perform initial shift. By the initial shift, the rack of the cam rod 13 meshes with one of the gears out of the gear group 11 rotated by the driving force of the loading motor 10, and then the cam rod 13 further shifts in the disc ejecting direction X3.

By the shifting of the cam rod 13, the clamp lever 16 rotates and the small-diameter disc 40 is attached onto the turntable 2, and the roller lever 9 rotates and the roller 8 leaves the small-diameter disc 40. Further, at this timing, as shown in FIG. 8, the rib 13a of the cam rod 13 is brought into contact with the actuator 5d of the mechanical switch 5e, whereby the mechanical switch 5e enters ON state. At this time, the F sensors 14a and 19a are in OFF state as shown in FIG. 13 because the light is not blocked by the small-diameter disc 40. On the other hand, the B sensors 7a and 19b are in ON state as shown in FIG. 13 because the light is blocked by the small-diameter disc 40. That is, the ON/OFF state of the F sensors 14a and 19a is different between the case where the large-diameter disc 30 is attached onto the turntable 2 and the case where the small-diameter disc 40 is attached onto the turntable 2. By detecting the ON/OFF state of the F sensors 14a and 19a, it becomes possible to recognize whether the optical disc attached onto the turntable 2 is the large-diameter disc 30 or the small-diameter disc 40. Based on the recognition result, the spindle motor 3 is driven to rotate the turntable 2, and recording or reproduction of information on or from the small-diameter disc 40 is performed.

Next, with reference to FIGS. 3, 7, and 13, a description will be given of the eject operation of the small-diameter disc 40.

When start of the eject operation of the small-diameter disc 40 is instructed by, e.g., the eject button (not shown) being pushed, the loading motor 10 is driven in the direction which is reverse to that in the carry-in mode. The reverse driving force of the loading motor 10 is transmitted to the roller 8 via the gear group 11, and the roller 8 rotates in the reverse direction. Further, the cam rod 13 shifts in the disc insert direction X2 by the gear group 11 that rotates in the reverse direction by the reverse driving force of the loading motor 10. By the shifting of the cam rod 13 in the disc insert direction X2, the rib 13a of the cam rod 13 and the actuator 5d of the mechanical switch 5e become away from each other, and the mechanical switch 5e enters OFF state. Further, by the shifting of the cam rod 13 in the disc insert direction X2, the clamp lever 16 rotates in the reverse direction, whereby the attached state of the small-diameter disc 40 onto the turntable 2 is released and the roller lever 9 rotates in the reverse direction, whereby the roller 8 is brought into contact with the small-diameter disc 40. Thus, the small-diameter disc 40 receives the rotation force of the roller 8 in the reverse direction and is carried in the disc ejecting direction X3.

When the small-diameter disc 40 passes through the position where the small-diameter disc 40 opposes to the B sensors 7a and 19b (see FIG. 7), the B sensors 7a and 19b enter OFF state because the light is not blocked by the small-diameter disc 40. Thus, driving of the loading motor 10 in the reverse direction stops, whereby the reverse rotation of the roller 8 stops. As a result, the small-diameter disc 40 is held in the state held between the roller 8 and the guide member 16c of the clamp lever 16, at the slightly overrun position from the position where the B sensors 7a and 19b have entered OFF state.

It is noted that, for the sake of convenience, both the large-diameter disc 30 and the small-diameter disc 40 are illustrated in FIGS. 6 and 7. However, practically, both the discs 30 and 40 are not carried in or ejected at the same time.

Next, with reference to FIGS. 3, 8, 9, and 14, a description will be given of the carry-in operation of the lens cleaner 20.

When the lens cleaner 20 is inserted into the disc insert slit 17a and the second light blocking portion 20e of the lens cleaner 20 arrives at the position opposing to the F sensors 14a and 19a, the F sensors 14a and 19a enter ON state. Thus, the loading motor 10 is driven, and the driving force of the loading motor 10 is transmitted to the roller 8 via the gear group 11, whereby the roller 8 rotates. In this state, when the lens cleaner 20 is further inserted, as shown in FIG. 9, the lens cleaner 20 is held between the roller 8 and the guide member 16c of the clamp lever 16, and is carried in the disc carry-in direction X2. It is noted that, at this time point, the optical disc device does not recognize whether the disc carried in the device is the large-diameter disc 30, the small-diameter disc 40, or the lens cleaner 20.

When the lens cleaner 20 is carried in the disc carry-in direction X2, the outer edge portion of the lens cleaner 20 is brought into contact with the lever group 12, and the lens cleaner 20 is guided by the lever group 12 so that the central hole 20a is positioned in close proximity to the turntable 2.

When the central hole 30a of the lens cleaner 20 shifts to close proximity to the turntable 2, the lever group 12 causes the cam rod 13 to perform the initial shift. By the initial shift, the rack of the cam rod 13 meshes with one of the gears out of the gear group 11 rotated by the driving force of the loading 10, and then the cam rod 13 further shifts in the disc ejecting direction X3.

By the shifting of the cam rod 13, the clamp lever 16 rotates and the lens cleaner 20 is attached onto the turntable 2, and the roller lever 9 rotates and the roller 8 leaves the lens cleaner 20. Further, at this timing, as shown in FIG. 8, the rib 13a of the cam rod 13 is brought into contact with the actuator 5d of the mechanical switch 5e, whereby the mechanical switch Se enters ON state. At this time, the B sensors 7a and 19b are in ON state as shown in FIG. 14 because the light is transmitted by the light transmitting portion 20d of the lens cleaner 20. On the other hand, the F sensors 14a and 19a are in OFF state as shown in FIG. 14 because the light is blocked by the second light blocking portion 20e of the lens cleaner 20. That is, the ON/OFF state of the F sensors 14a and 19a and the B sensors 7a and 19b is different between the case where the large-diameter disc 30 or the small-diameter disc 40 is attached onto the turntable 2 and the case where the lens cleaner 20 is attached onto the turntable 2. By detecting the ON/OFF state of the F sensors 14a and 19a and the B sensors 7a and 19b, it becomes possible to recognize whether the object attached onto the turntable 2 is the large-diameter disc 30, the small-diameter disc 40, or the lens cleaner 20. When the optical disc device according to the present embodiment recognizes that the object attached onto the turntable 2 is the lens cleaner 20, the brush 20c of the lens cleaner 20 performs the cleaning operation of the objective lens 4a of the optical head 4.

Next, with reference to FIGS. 2, 10, and 11, a description will be given of an exemplary cleaning operation of the objective lens 4a of the optical head 4.

When the lens cleaner 20 is attached onto the turntable 20 and the mechanical switch 5e switches from OFF state to ON state, the spindle motor 3 is driven to rotate the turntable 2. At this time, the objective lens 4a of the optical head 4 is positioned to be away from the inside of the rotation track 20f of the brush 20c of the lens cleaner 20. It is noted that, the chassis 1 is provided with a groove 1d for avoiding contact with the brush 20c at the position corresponding to the rotation track 20f of the brush 20c.

When the rotation speed of the lens cleaner 20 attached onto the turntable 2 reaches a prescribed rotation speed, the traverse motor 5b is driven and the feed shaft 5a rotates (see FIG. 2). This allows the optical head 2 to shift in the radial direction X1 and, as shown in FIG. 11, the objective lens 4a shifts onto the rotation track 20f of the brush 20c. As a result, the brush 20c is brought into contact with the objective lens 4a, and the objective lens 4a is cleaned.

It is noted that, the cleaning operation of the objective lens 4a of the optical head 4 is not limited to the operation described above, and can be practiced in various modes. For example, the lens cleaner 20 may be rotated after the objective lens 4a is shifted inside of the rotation track 20f of the brush 20c. It is noted that, with the optical disc device disclosed in Patent Document 2, the objective lens is cleaned by causing the cleaning member of the lens cleaner to advance or recede in the disc carry-in direction using the retry operation. Therefore, the cleaning member only shifts in one direction. Accordingly, it is necessary to adjust the objective lens in the width direction of the device so that the cleaning member and the objective lens are brought into contact with each other. Further, there is a limitation that the objective lens cannot be arranged behind the turntable in the disc carry-in direction, in order to avoid contact between the cleaning member and the turntable. In contrast thereto, with the optical disc device according to the present embodiment, by causing the lens cleaner 20 to rotate, the objective lens 4a is cleaned. Accordingly, the objective lens 4a can be arranged behind the turntable 2.

Further, the objective lens 4a may be cleaned by arranging the brush 20c of the lens cleaner 20 inside the shift track of the objective lens 4a, and thereafter shifting the objective lens 4a without shifting the brush 20c. The carrying of the optical head 4 in a reciprocating manner involves shorter stroke and hence is easier to be performed, as compared to the case where the optical disc is carried in a reciprocating manner by the retry operation. Further, the optical head 4 can easily be carried in a reciprocating manner for a few dozen times. Accordingly, the grime on the objective lens 4a can more surely be cleaned off. It is noted that, in this case, it is preferable that the brush 20 is not provided so as to extend in the radial direction of the lens cleaner 20 as shown in FIG. 4, but instead, the brush 20 is provided so as to extend in the circumferential direction. Thus, without the necessity of taking into consideration of the position of the brush 20c, the brush 20c and the objective lens 4a can easily be brought into contact with each other.

Next, with reference to FIGS. 3, 9, and 14, a description will be given of the eject operation of the lens cleaner 20.

When start of the eject operation of the lens cleaner 20 is instructed by, e.g., the eject button (not shown) being pushed, the loading motor 10 is driven in the direction which is reverse to that in the carry-in mode. The reverse driving force of the loading motor 10 is transmitted to the roller 8 via the gear group 11, and the roller 8 rotates in the reverse direction. Further, the cam rod 13 shifts in the disc insert direction X2 by the gear group 11 that rotates in the reverse direction by the reverse driving force of the loading motor 10. By the shifting of the cam rod 13 in the disc insert direction X2, the rib 13a of the cam rod 13 and the actuator 5d of the mechanical switch 5e become away from each other, and the mechanical switch Se enters OFF state. Further, by the shifting of the cam rod 13 in the disc insert direction X2, the clamp lever 16 rotates in the reverse direction, whereby the attached state of the lens cleaner 20 onto the turntable 2 is released and the roller lever 9 rotates in the reverse direction, whereby the roller 8 is brought into contact with the lens cleaner 20. Thus, the lens cleaner 20 receives the rotation force of the roller 8 in the reverse direction and is carried in the disc ejecting direction X3.

When the lens cleaner 20 passes through the position where the lens cleaner 20 opposes to the B sensors 7a and 19b (see FIG. 7), the B sensors 7a and 19b enter OFF state because the light is not blocked by the lens cleaner 20. Thus, driving of the loading motor 10 in the reverse direction stops, whereby the reverse rotation of the roller 8 stops. As a result, the lens cleaner 20 is held in the state held between the roller 8 and the guide member 16c of the clamp lever 16, at the slightly overrun position from the position where the B sensors 7a and 19b have entered OFF state.

It is noted that, as shown in FIGS. 12 to 14, in the eject operation of any of the large-diameter disc 30, the small-diameter disc 40, and the lens cleaner 20, driving of the loading motor 10 is stopped at the timing when the B sensors 7a and 19b switch from OFF state to ON state. According to the present embodiment, since the light transmitting portion 20d of the lens cleaner 20 is formed to be annular, as shown in FIG. 14, the B sensors 7a and 19b also switch from OFF state to ON state at the timing when the light transmitting portion 20d of the lens cleaner 20 passes the B sensors 7a and 19b. When the driving of the loading motor 10 is stopped at this timing, the lens cleaner 20 stops short of the prescribed eject position, and lens cleaner 20 will not easily be taken out.

Accordingly, for example, it is preferable that the ON/OFF state of the B sensors 7a and 19b is not recognized in the period during which the light transmitting portion 20d of the lens cleaner 20 is expected to pass through the B sensors 7a and 19b. Thus, the lens cleaner 20 can be ejected at the eject position identical to that of the large-diameter disc 30.

Further, according to the present embodiment, when the light transmitting portion 20d of the lens cleaner 20 shifts to the position where the light transmitting portion 20d opposes to the B sensors 7a and 19b and the B sensors 7a and 19b enter OFF state, the F sensors 14a and 19a stays in ON state. On the other hand, when the entire lens cleaner 20 passes through the B sensors 7a and 19b and the B sensors 7a and 19b enter OFF state, the light transmitting portion 20d of the lens cleaner 20 shifts to the position where the light transmitting portion 20d opposes to the F sensors 14a and 19a and the F sensors 14a and 19a enter OFF state. Accordingly, in the ejection mode of the lens cleaner 20, drive of the loading motor 10 may be stopped when both the F sensors 14a and 19a and the B sensors 7a and 19b enter OFF state. Thus, the lens cleaner 20 can be ejected at the eject position identical to that of the large-diameter disc 30.

Figure 15:
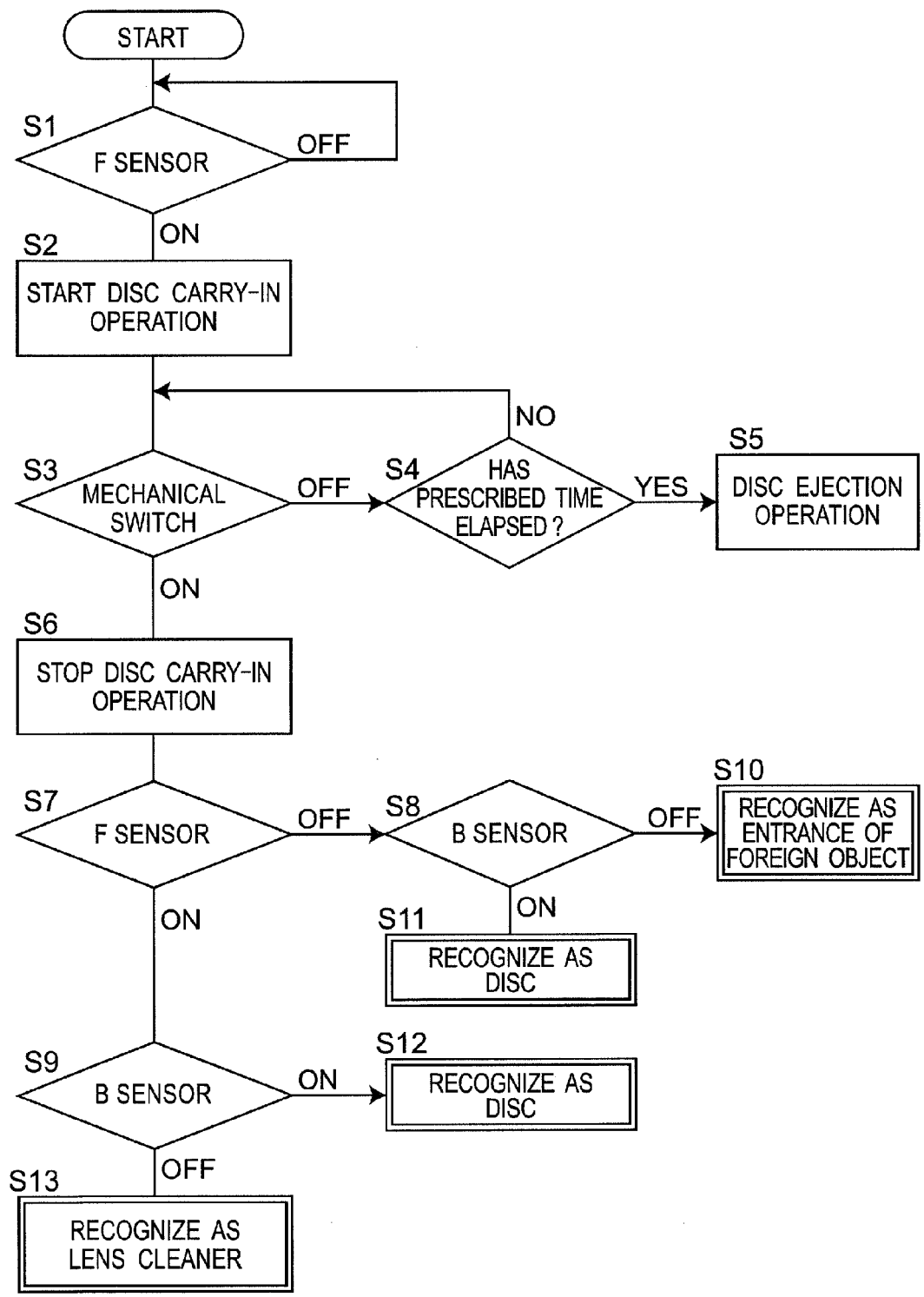
FIG. 15 is a flowchart showing an exemplary control flow of the optical disc device according to the embodiment of the present invention.

Next, with reference to FIG. 15, a description will be given of a control flow of the optical disc device according to the present embodiment.

Firstly, when one of the large-diameter disc 30, the small-diameter disc 40, the lens cleaner 20, and other foreign object is inserted into the disc insert slit 17a and the F sensors 14a and 19a enter ON state (Step S1), the disc carry-in operation is started (Step S2).

Subsequently, whether or not the mechanical switch 5e enters ON state within a prescribed time (e.g., 3 sec) is detected (Steps S3 and S4). When the mechanical switch 5e stays OFF state after a lapse of the prescribed time, it is considered that an error has occurred. Therefore, the disc eject operation is performed (Step S5). On the other hand, when the mechanical switch 5e enters ON state within the prescribed time, the disc carry-in operation is stopped (Step S6).

Subsequently, the ON/OFF state of the F sensors 14a and 19a and the B sensors 7a and 19b are detected (Steps S7 to S9).

When the F sensors 14a and 19a are in OFF state and the B sensors 7a and 19b are in OFF state, it is recognized that a foreign object enters inside the device (Step S10). In this case, when the cleaning operation is performed, the foreign object may damage the components such as the turntable 2 or the objective lens 4a. Accordingly, when it is recognized that a foreign object enters inside the device, the cleaning operation is not performed.

When the F sensors 14a and 19a are in OFF state and the B sensors 7a and 19b are in ON state, it is recognized that the small-diameter disc 40 is attached onto the turntable 2 (Step S11). After the recognition, the spindle motor 3 is driven to rotate the turntable 2, and recording or reproduction of information on or from the small-diameter disc 40 is performed.

When the F sensors 14a and 19a are in ON state and the B sensors 7a and 19b are in ON state, it is recognized that the large-diameter disc 30 is attached onto the turntable 2 (Step S12). After the recognition, the spindle motor 3 is driven to rotate the turntable 2, and recording or reproduction of information on or from the large-diameter disc 30 is performed.

When the F sensors 14a and 19a are in ON state and the B sensors 7a and 19b are in OFF state, it is recognized that the lens cleaner 20 is attached onto the turntable 2 (Step S13). After the recognition, the cleaning operation described above is performed.

With the optical disc device according to the present embodiment, attachment of the lens cleaner 20 onto the turntable 2 is recognized based on the ON/OFF state of the F sensors 14a and 19a and the B sensors 7a and 19b. That is, with the optical disc device according to the present embodiment, attachment of the lens cleaner 20 onto the turntable 2 is recognized through the method different from that disclosed in Patent Document 1. Accordingly, even when the objective lens 4a is greatly grimed, the cleaning operation such as rotating the turntable 2 can be performed.

Further, with the optical disc device according to the present embodiment, the cleaning operation is performed of ter attachment of the lens cleaner 20 onto the turntable 2 is recognized. Therefore, the optimum cleaning operation for cleaning the grime of f from the objective lens 4a can be performed. Accordingly, the grime on the objective lens 4a can more surely be cleaned off.

Further, with the optical disc device according to the present embodiment, since the light transmitting portion 20d of the lens cleaner 20 is formed to be annular, the light transmitting portion 20d can be positioned at the position opposing to the B sensors 7a and 19b, without paying attention as to from which position the lens cleaner 20 is to be inserted into the disc insert slit 17a. It is noted that the light transmitting portion 20d of the lens cleaner 20 is not limited to be formed into an annular shape, so long as it is formed to the position opposing to the B sensors 7a and 19b when the position lens cleaner 20 is attached onto the turntable 2.

It is noted that, the present invention is not limited to the foregoing embodiment, and can be practiced in various other modes. For example, in the foregoing, though the description has been given of the mechanical switch 5e as an exemplary attachment detecting sensor detecting that the optical disc is attached onto the turntable 2, the present invention is not limited thereto. For example, the attachment detecting sensor may be an optical sensor such as a photo interrupter. Further, the loading motor 10 may be turned OFF after a lapse of a prescribed time (i.e., at the timing when the optical disc is attached onto the turntable 2) since the F sensors 14a and 19a enter ON state. In this case, the necessity of providing the mechanical switch 5e can be eliminated.

Although the present invention has been fully described in connection with the preferred embodiments thereof with reference to the accompanying drawings, it is noted that various changes and modifications are apparent to those skilled in the art. Such changes and modifications are to be understood as included within the scope of the present invention as defined by the appended claims unless they depart therefrom.

INDUSTRIAL APPLICABILITY

The optical disc device according to the present invention can more surely clean the grime off from the objective lens, even when the objective lens is greatly grimed. Therefore, it is particularly useful for an optical disc device that is used in the environment where the objective lens is prone to be grimed.

The invention claimed is:

1. An optical disc device, comprising:
   a spindle motor that rotates a turntable to which an optical disc is to be attached;
   an optical head which emits light from an objective lens to the optical disc to perform recording or reproduction of information;
   an insertion detection optical sensor which detects that the optical disc is inserted into a disc insert slit based on light emitted from a first light emitting element to a first light receiving element being blocked;
   an ejection detection optical sensor provided on a downstream side in a disc carry-in direction to the insertion detection optical sensor, the ejection detection optical sensor detecting that the optical disc is ejected to the disc insert slit based on light emitted from a second light emitting element to a second light receiving element being blocked;
   a lens cleaner to be attached to the turntable, the lens cleaner including a light blocking portion and a light transmitting portion, the light blocking portion being configured to block the light emitted from the first light emitting element to the first light receiving element when the lens cleaner is attached to the turntable, the light transmitting portion being configured to transmit the light emitted from the second light emitting element to the second light receiving element when the lens cleaner is attached to the turntable; and
   a control circuit configured such that, in a state in which the optical disc is attached to the turntable, when the light emitted from the first light emitting element to the first light receiving element is blocked and the light emitted from the second light emitting element to the second light receiving element is not blocked, the control circuit recognizes that the lens cleaner is attached to the turntable as the optical disc, and the optical disc device performs a cleaning operation.

2. The optical disc device according to claim 1, wherein the cleaning operation is an operation in which the turntable is rotated to thereby bring a cleaning member of the lens cleaner into contact with the objective lens to clean the objective lens.

3. The optical disc device according to claim 1, wherein the cleaning operation is an operation in which the optical head is carried in a reciprocating manner in a radial direction, to thereby bring the objective lens into contact with a cleaning member of the lens cleaner to clean the objective lens.

4. The optical disc device according to claim 1, further comprising;
   an attachment detecting sensor which detects that the optical disc is attached onto the turntable;
   wherein, in a state in which the attachment detecting sensor detects that the optical disc is attached onto the turntable, when the light emitted from the first light emitting element to the first light receiving element is blocked and the light emitted from the second light emitting element to the second light receiving element is not blocked, the control circuit recognizes that the lens cleaner is attached to the turntable as the optical disc, and the optical disc device performs the cleaning operation.

5. A lens cleaner to be used for cleaning an optical disc device, the optical disc device including a spindle motor that rotates a turntable to which an optical disc is to be attached; an optical head which emits light from an objective lens to the optical disc to perform recording or reproduction of information; an insertion detection optical sensor which detects that the optical disc is inserted into a disc insert slit based on light emitted from a first light emitting element to a first light receiving element being blocked; and an ejection detection optical sensor provided on a downstream side in a disc carry-in direction to the insertion detection optical sensor, the ejection detection optical sensor detecting that the optical disc is ejected to the disc insert slit based on light emitted from a second light emitting element to a second light receiving element being blocked, the lens cleaner comprising:
   a light blocking portion which blocks the light emitted from the first light emitting element to the first light receiving element when the lens cleaner is attached onto the turntable; and
   a light transmitting portion which transmits the light emitted from the second light emitting element to the second light receiving element; when the lens cleaner is attached onto the turntable;
   wherein, in a state in which the optical disc is attached to the turntable, when the light emitted from the first light emitting element to the first light receiving element is blocked and the light emitted from the second light emitting element to the second light receiving element is not blocked, a control circuit of the optical disc device recognizes that the lens cleaner is attached to the turntable as the optical disc so that the optical disc device can perform a cleaning operation.

6. The lens cleaner according to claim 5, wherein the lens cleaner is formed to be disc-like, and the light transmitting portion is formed to be annular.

* * * * *